US012752927B2

(12) United States Patent
Avenel et al.

(10) Patent No.: US 12,752,927 B2
(45) Date of Patent: Oct. 6, 2026

(54) LOCK SYSTEM FOR TURBINE ENGINE NACELLE AND NACELLE INCLUDING SAME

(71) Applicant: SAFRAN NACELLES, Gonfreville-l'Orcher (FR)

(72) Inventors: Philippe Avenel, Moissy-Cramayel (FR); Pierre Pellerin, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 19/119,180

(22) PCT Filed: Oct. 11, 2023

(86) PCT No.: PCT/FR2023/051581
§ 371 (c)(1),
(2) Date: Apr. 8, 2025

(87) PCT Pub. No.: WO2024/079423
PCT Pub. Date: Apr. 18, 2024

(65) Prior Publication Data

US 2026/0138749 A1 May 21, 2026

(30) Foreign Application Priority Data

Oct. 13, 2022 (FR) ...................................... 2210506

(51) Int. Cl.
*B64D 29/06* (2006.01)

(52) U.S. Cl.
CPC .................................... *B64D 29/06* (2013.01)

(58) Field of Classification Search
CPC .... E05C 19/14; E05C 19/145; E05B 15/0086; Y10T 292/216; B64D 29/06
See application file for complete search history.

(56) References Cited

U.S. PATENT DOCUMENTS 4,116,479 A 9/1978 Poe
10,392,830 B2 * 8/2019 Helsley ............... E05B 27/0046
(Continued)

FOREIGN PATENT DOCUMENTS

EP 1927711 A2 6/2008

OTHER PUBLICATIONS

International Search Report mailed Jan. 22, 2024, issued in corresponding International Application No. PCT/FR2023/051581, filed Oct. 11, 2023, 5 pages.
(Continued)

*Primary Examiner* — Christine M Mills
*Assistant Examiner* — Yahya Sidky
(74) *Attorney, Agent, or Firm* — Christensen O'Connor Johnson Kindness PLLC

(57) ABSTRACT

A lock system for a turbine engine nacelle, having: a support supporting a hook a three-point lock, a yoke and a three-point mechanism hingedly connected to a point of the support; and an actuating handle for actuating the mechanism between the locked and unlocked positions. Where the actuating handle can be connected to the three-point mechanism and a locking bush to pivot between a first end position when the three-point mechanism is locked and a second end position when the three-point mechanism is unlocked, and where the lock system includes a blocking tool to move the locking bush between a blocked position and an unblocked position when the bush is in the first end position, and to prevent the actuating handle from moving while the bush is in the blocked position.

10 Claims, 9 Drawing Sheets

(56) References Cited

U.S. PATENT DOCUMENTS

| | | | | |
|---|---|---|---|---|
| 2015/0184554 | A1 | 7/2015 | Nendel | |
| 2020/0300011 | A1* | 9/2020 | Micallef ............... | E05C 19/145 |
| 2020/0386022 | A1* | 12/2020 | Hedges ..................... | E05B 1/00 |

OTHER PUBLICATIONS

Written Opinion mailed Jan. 22, 2024, issued in corresponding International Application No. PCT/FR2023/051581, filed Oct. 11, 2023, 8 pages.

* cited by examiner

LOCK SYSTEM FOR TURBINE ENGINE NACELLE AND NACELLE INCLUDING SAME

CROSS-REFERENCE TO RELATED APPLICATIONS

This application is a National Stage of International Application No. PCT/FR2023/051581. filed Oct. 11, 2023, which claims priority to French Patent Application No. 2210506, filed Oct. 13, 2022, the entire disclosures of which are hereby incorporated by reference in their entirety for all purposes.

TECHNICAL FIELD

This invention concerns a lock system for a turbine engine nacelle, in particular for an aircraft turbine engine, and a nacelle equipped with such a lock system comprising a first cowl and a second cowl. The lock system is shaped to lock the cowls in a closed position when in a locking configuration and to allow the cowls to be opened when in an unlocking configuration.

PRIOR ART

The engine units for the aircrafts generally comprise a nacelle forming a generally annular outer envelope housing inside a turbine engine arranged along the longitudinal axis of this nacelle. The turbine engine receives fresh air from the upstream side, and rejects the hot gases from the combustion of the fuel on the downstream side, which provide a certain amount of thrust.

An aircraft turbine engine generally comprises, from upstream to downstream, a fan and several modules such as a low-pressure compressor followed by a high-pressure compressor, a combustion chamber, a high-pressure turbine followed by a low-pressure turbine, which drive the corresponding low- or high-pressure compressor, and a gas ejection system. The upstream and downstream are defined in relation to the normal direction of gas flow in a flow duct (from upstream to downstream).

In the case of the turbine engines with dual flow, a primary air flow passes through the high-pressure and low-pressure bodies and the fan produces a secondary air flow which circulates in the turbine engine, between a casing and a nacelle or external envelope of the turbine engine, in a cold flow channel. At the nozzle outlet, the gases from the primary flow are mixed with the secondary flow to produce a propulsion force, with the secondary flow providing most of the thrust in normal operation, giving a direct jet.

Some nacelles comprise a thrust reverser system that at least partially closes the cold air annular duct and rejects the secondary flow forward, forming a reverse jet that generates a counter-thrust to brake the aircraft. A known type of nacelle comprises two half-cowls or cowls covering the median section surrounding the secondary flow fan, connected to each other by a hinge having a longitudinal axis located at the upper part, so as to allow the lower parts of these cowls to be opened for maintenance operations.

The cowls are held in the closed position, generally at the lower part, by locks that clamp the two cowls together tangentially.

In a known way, these locks comprise a hook and a loop, each attached to one of the cowls. In a locking configuration of the bolts, the hook engages in a retaining manner with the loop in a closed position of the cowls. When the locks are in an unlocked position, the hook is released from the loop and the cowls may be opened.

The locks are generally operated manually by a control handle. The forces required to lock or unlock the lock are sometimes difficult to achieve, especially when the locks are positioned close to the floor.

In addition, when positioned outside the nacelle, the locks and/or the control handle create aerodynamic defects.

In addition, the current locks have a capacity of take-up for the two cowls limited by the use of the control handle and the presence of an oblong hole machined in the hook, which has to be lengthened to increase the take-up capacity. However, this leads to a considerable increase in the mass of the lock. It is also known to modify the positions of the pivot points of the connecting rods so as to avoid the presence of an oblong hole. However, this solution requires the lengthening of the connecting rods to increase the take-up capacity.

The current locks also have the disadvantage of not being very secure, as they may be opened without any special tooling if the operating handles are not equipped with a locking key.

Finally, conventional locks generally do not comprise a locking indicator that may be seen from a distance outside the nacelle. With conventional locks, only the control handle, which hangs by gravity outside the aerodynamic surfaces of the cowls, may alert an operator that the lock of the cowls is not locked.

The climate change is a major concern for many legislative and regulatory members around the world. Various restrictions on carbon emissions have been, are being or will be adopted by various states. In particular, an ambitious standard applies both to new types of aircraft and to those currently in circulation, which will require the implementation of technological solutions so as to bring them into line with the current regulations. For several years now, the civil aviation has been working to help combat climate change.

Technological research efforts have already led to significant improvements in the environmental performance of the aircrafts. The Applicant takes into account the impacting factors in all the design and development phases to obtain aeronautical elements and products that consume less energy, are more environmentally friendly and whose integration and use in civil aviation have moderate environmental impacts with the aim of improving the energy efficiency of the aircrafts.

As a result, the Applicant is constantly working to reduce its impact on the climate by using virtuous development and manufacturing methods and processes that minimize greenhouse gas emissions as much as possible in order to reduce the environmental footprint of its business.

This sustained research and development work is focused on the new generations of aircraft engines, making aircraft lighter, particularly through the materials used and the lighter on-board equipment, developing the use of electrical technologies for propulsion and, as an essential complement to technological progress, the aeronautical biofuels.

The aim of the present invention is therefore to propose a nacelle locking system that allows to overcome at least some of these disadvantages of the prior technique, in particular without adding mass.

SUMMARY OF THE INVENTION

To this end, the invention relates to a lock system for a turbine engine nacelle comprising a first and a second cowls, the lock system comprising:

a support configured to be attached to the first cowl and supporting a hook referred to as the main hook;

a three-point lock configured to be attached to the second cowl, comprising a support, a yoke secured to the support and a three-point mechanism hingedly connected at a point on the support, the three-point mechanism being movable between a locked position wherein the hook cooperates in a retaining manner with the yoke in a closed position of the cowls and an unlocked position wherein the hook is disengaged from the yoke and allows the cowls to be opened; and an actuating handle for actuating the three-point mechanism between the locked and unlocked positions, the actuating handle having a first end connected to the three-point mechanism.

According to the invention, the actuating handle comprises a locking bush secured to a second end opposite the first end, the bush being mounted so as to pivot relative to the support of the three-point lock between a first end position when the three-point mechanism is in the locked position and a second end position when the three-point mechanism is in the unlocked position.

According to the invention, the lock system also comprises a blocking tool adapted to cooperate with the locking bush and configured to maneuver the locking bush between a blocked position and an unblocked position when the locking bush is in its first end position, and to prevent a maneuver of the actuating handle as long as the locking bush is in its blocked position.

In this way, the invention allows to achieve a locking under mechanical tension using a special blocking tool for easier closure than with conventional lock systems. The locking forces are exerted using a tool with a longer handle, reducing the effort required. The length of the handle may also allow a greater hook pre-load.

In addition, locking by means of a blocking tool that tilts the 3-point lock allows to reduce the impact on the external aerodynamic surface of the cowls, greatly improving the performance compared with current locks, which require clearance that leads to setbacks and/or spaces around the handles.

According to a particular embodiment of the invention, it is possible to integrate a locking indicator function, for example a flag visible from a distance, which may only be removed if the locks are perfectly closed.

In another embodiment compatible with the previous one, the lock system according to the invention comprises a take-up system configured to take the second cowl up to the first cowl in order to close the cowls.

The lock system according to the invention may comprise one or more of the following characteristics, taken in isolation from each other or in combination with each other in any technically possible combination:

the blocking tool comprises a coupling head arranged at one end of a rod, the coupling head and the locking bush being shaped to couple to each other as long as the locking bush is not in its blocked position and to disengage from each other when the locking bush is in its first end position;

the blocking tool forms a male part of a bayonet coupling and the locking bush forms a female part of the bayonet coupling;

the blocking tool comprises a locking indicator visible outside the nacelle as long as the coupling head and the locking bush are coupled together;

the locking bush comprises a cylindrical body and a locking nipple extending radially from the cylindrical body, the locking nipple is configured to hold the hook in engagement with the yoke when the locking bush is in the blocked position;

the lock system comprises a take-up system configured to take the second cowl up to the first cowl in order to close the cowls;

the take-up system comprises a rack slide which may be moved in translation relative to the support of the hook in the direction of the second cowl, at least one auxiliary hook arranged on the rack slide and configured to cooperate in a retaining manner with the yoke when the cowls are taken-up, and a control pinion configured to mesh with the rack of the rack slide, causing the latter to move in translation between an advanced position wherein the cowls are moved away from each other and a retracted position wherein the cowls are taken-up towards each other, allowing the cowls to be closed;

the take-up system comprises two auxiliary hooks arranged on either side of the main hook;

the control pinion may be operated manually;

the control pinion may be operated by an electric motor;

the support of the hook comprises a plate shaped to extend in a plane transverse to the hook, the plate comprising a through orifice shaped to receive the blocking tool, the through orifice being shaped to allow the removal of the blocking tool only when the locking bush is in its blocked position.

The invention also relates to a turbine engine nacelle comprising a first cowl, a second cowl, and a lock system according to the invention and as described above, the support supporting the hook being attached to the first cowl and the lock of the three-point mechanism type being attached to the second cowl, the lock system being shaped to lock the cowls in the closed position when it occupies a locking configuration and to allow the cowls to be opened when it occupies an unlocking configuration.

The invention also relates to a turbine engine comprising at least one nacelle according to the invention and as described above.

BRIEF DESCRIPTION OF FIGURES

The invention will be better understood and other details, characteristics and advantages of the present invention will become clearer from the following description made by way of non-limiting example and with reference to the attached drawings, wherein.

The elements with the same functions in the different implementations have the same references in the figures.

DESCRIPTION OF THE EMBODIMENTS

Figure 1:
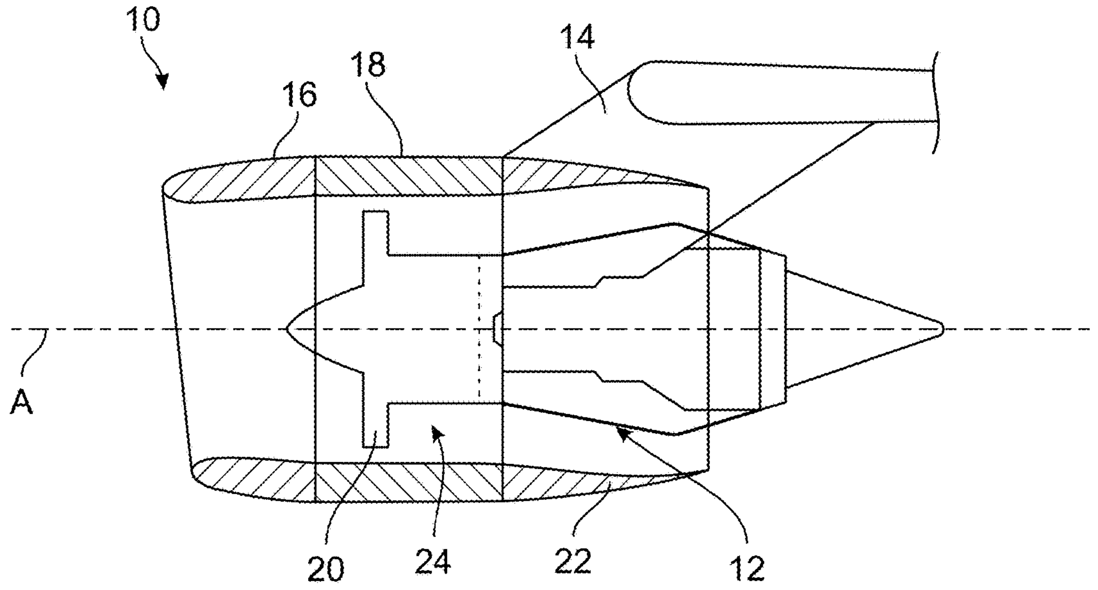
FIG. 1 is a schematic view of a turbine engine nacelle in axial cross-section.

FIG. 1 shows a nacelle 10 containing a turbine engine 12 supported by a pylon 14 attached under the wing of an aircraft. The nacelle 10 comprises a front section 16 comprising a profiled air inlet, a central section 18 surrounding the cold air fan 20, and a rear section 22 comprising a thrust reverser, for example with grids or doors. The nacelle 10 forms an external profile of the annular duct 24 guiding the flow of cold air, and an aerodynamic outer fairing.

The nacelle 10 has a longitudinal axis A and is annular around this axis.

The central section 18 of the nacelle comprises two outer covering cowls, for example fan cowls, arranged symmetrically with respect to a vertical axial plane, which may be opened laterally by pivoting about a hinge comprising a longitudinal axis arranged at the upper part and parallel to the longitudinal axis A of the nacelle 10.

The rear section 22 comprises two rear side parts, which close onto each other in the same plane of axial symmetry.

The invention applies to any nacelle of a turbine engine comprising two cowls or two rear side parts that may open and close on top of each other, and in particular to the nacelle shown in FIG. 1. In particular, these two cowls may be fan cowls or reverser cowls that slide backwards during a thrust reversal phase.

In particular, these cowls and/or these rear parts close by being connected along a plane of symmetry P. The two cowls, hereinafter referred to as 26, 28, are clamped together in a tangential direction, referred to as T, by at least one lock system 30 in accordance with the invention, as described in detail in relation to FIGS. 2 to 17.

Figure 2:
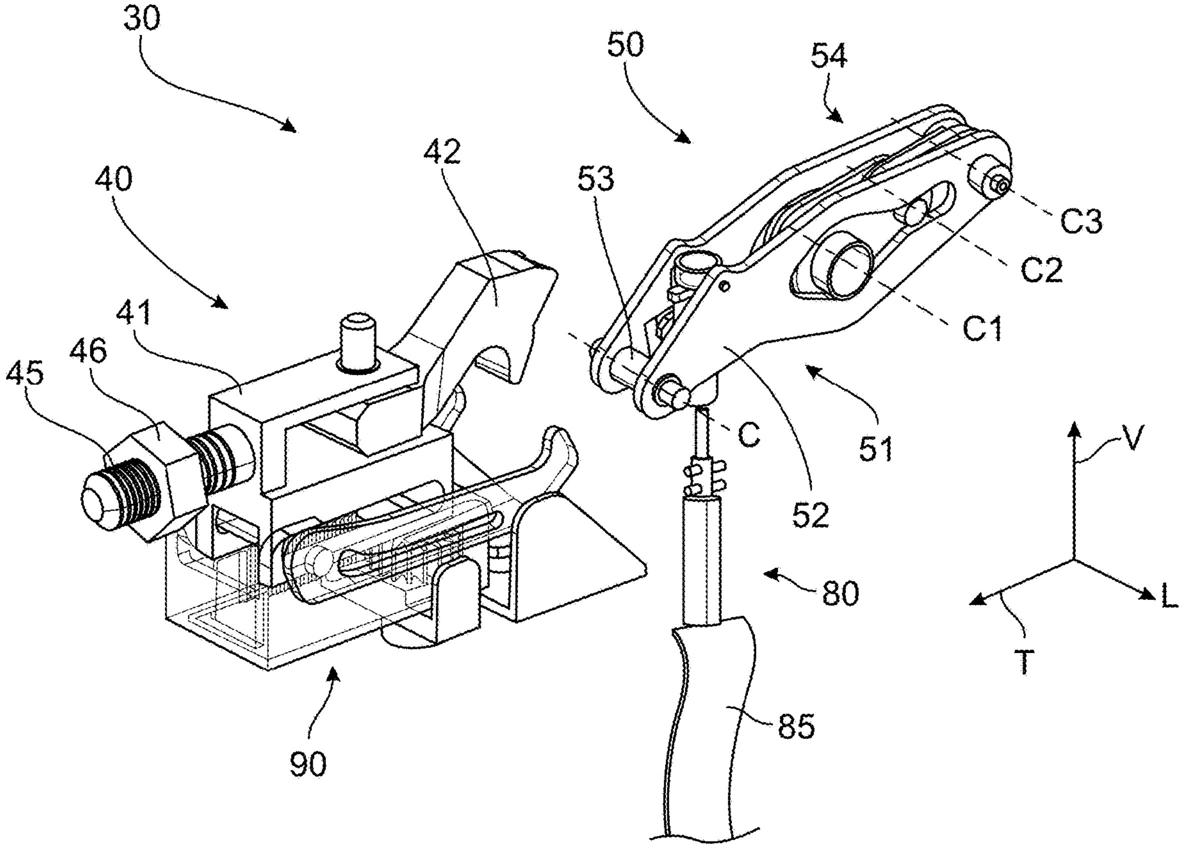
FIG. 2 is a schematic perspective view of a lock system according to the invention.

FIG. 2 shows a perspective view of such a lock system 30.

In the remainder of this description, the terms longitudinal, vertical and transverse will be adopted with reference to the L, V, T trihedron shown in FIGS. 2 to 17. The longitudinal direction L corresponds substantially to the longitudinal axis of the nacelle when the lock system is installed on it.

The lock system 30 is shaped to lock the first cowl 26 and the second cowl 28 in a closed position when in a locking configuration and to allow the cowls to be opened when in an unlocking configuration.

The lock system 30 comprises two parts, each configured to be attached to one of the cowls: a first part 40 configured to be attached to the first cowl 26 and a second part 50 configured to be attached to the second cowl 28.

The first part 40 comprises a support 41 configured to be attached to the first cowl 26 and a hook 42, referred to as the main hook, supported by the support 41.

In the example illustrated in FIGS. 2 and 11 to 15, the support 41 of the first part 40 is attached to the first cowl 26 by an attachment system of the screw 45—nut 46 type. Advantageously, thanks to this screw-nut type attachment system, it is possible to modify the preload of the locking mechanism of the lock system 30, for example by means of bores on the surface of the nut bearing against a portion of the first cowl 26. In a known way, these bores form indentation positions to modify the preload and ensure that the lock system does not go out of adjustment when powered up.

The second part 50 comprises a lock referred to as three-point lock 51 configured to be attached to the second cowl 28. The three-point lock 51 comprises a support 52, a yoke 53 (also referred to as a loop 53) secured to the support 52 and a three-point mechanism 54.

The support 52 preferably comprises two parallel side walls that are secured to each other, the walls extending in transverse planes, i.e. extending in the directions V and T shown in FIGS. 2 to 17.

The yoke 53 has an axis C for gripping the hook 42 which extends in the longitudinal direction L. The loop 53 is arranged between the two walls of the support 52 at a first end 52A thereof.

The three-point mechanism 54 is also housed between the two side walls of the support 52 at a second end 52B thereof opposite the first end 52A. It is hinged to the support 52 of the three-point lock. To this end, the mechanism 54 comprises two connecting rods hinged in relation to each other:

- a first connecting rod 55, a first end 55A of which is mounted so as to rotate freely about an axis of rotation C1 and a second end 55B of which is also mounted so as to rotate about an axis of rotation C2, and
- a second connecting rod 56, a first end 56A of which is mounted so as to rotate freely about the axis of rotation C2 and a second end 56B of which is also mounted so as to rotate about an axis of rotation C3.

The axes of rotation C1, C2 and C3 are parallel to each other and to the gripping axis C of the hook 42. The axis C1 is also referred to as the main axis of the lock and is secured to the second cowl 26. The axis C2 is the connecting axis between the two connecting rods 55, 56 of the three-point mechanism 54.

In this way, the assembly of the connecting rods 55, 56 of the three-point mechanism 54 is housed between the two side walls of the support 52.

The three-point mechanism 54 is movable between a locked position (FIGS. 3, 14 and 15) wherein the hook 42 cooperates in a retaining manner with the loop 53 in a closed position of the cowls 24, 26 and an unlocked position (FIGS. 4, 11 to 13) wherein the hook 42 is released from the loop 53 and allows the cowls 24, 26 to be opened.

Figure 4:
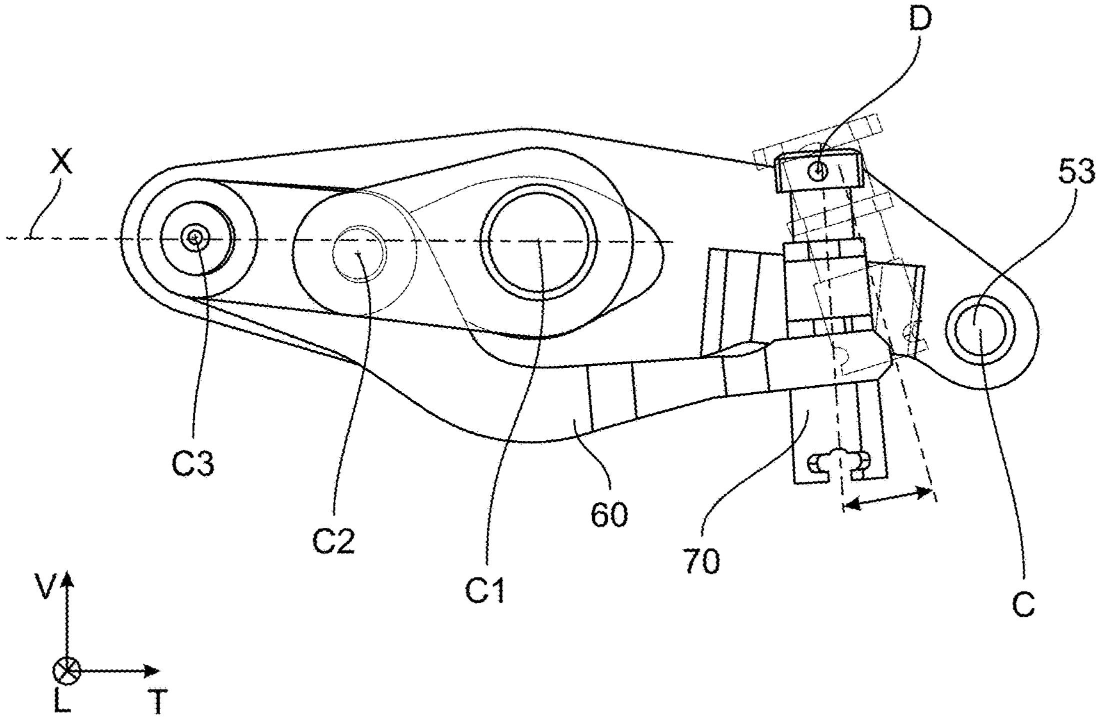
FIG. 4 is a schematic cross-sectional view of a part of a lock system of FIG. 2 relating to a three-point lock in an unlocked position.

In the unlocked position illustrated in particular in FIG. 4, the three-point mechanism 54 is such that the three axes C1, C2 and C3 are misaligned with respect to a line marked X, referred to as the force alignment line, along which the three axes C1, C2 and C3 are aligned. Whatever the position of the lock, this line, marked X, passes through the axes C1 and C3. More precisely, in the unlocked position, the axis C2 of the three-point mechanism 54 is below the line of alignment of the forces X in the vertical direction V. In other words, the axis C2 of the three-point mechanism 54 is closer to the outside of the nacelle 10 (and the cowls 26, 28) than the axes C1 and C3.

Figure 3:
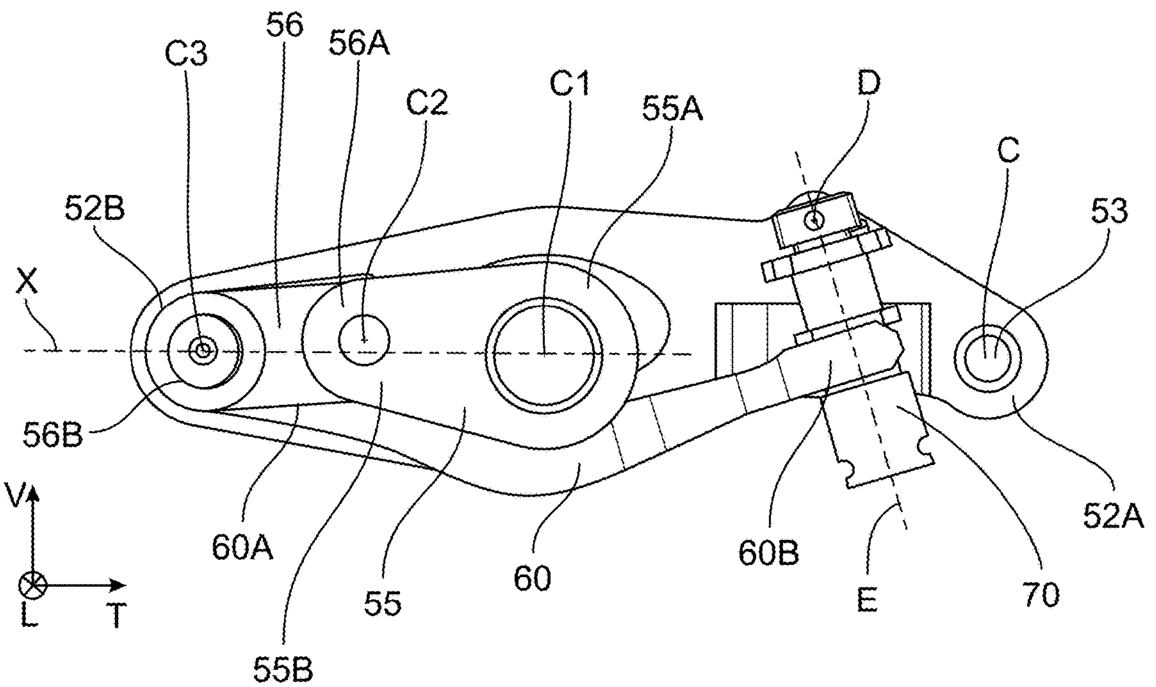
FIG. 3 is a schematic cross-sectional view of a part of a lock system of FIG. 2 relating to a three-point lock in a locked position.

In contrast, in the locked position shown in particular in FIG. 3, the three-point mechanism 54 is such that the three axes C1, C2 and C3 are equally misaligned with respect to the line X aligning the forces so that the axis C2 of the three-point mechanism 54 is above the line aligning the forces X in the vertical direction V. In other words, the axis C2 of the three-point mechanism 54 is further away from the outside of the nacelle 10 (and the cowls 26, 28) than the axes C1 and C3.

In the example shown in the figures, it is therefore necessary to provide an effort, in particular a vertical effort from bottom to top in the figures, to move the three-point mechanism 54 from its unlocked position to its locked position and vice versa.

Of course, according to another example, the vertical force to be applied may be from top to bottom to move the three-point mechanism 54 from its unlocked position to its locked position and vice versa.

In other words, according to the invention, it is necessary to provide a force to tilt the axis C2 from one side to the other of the line X aligning the forces in order to move the three-point mechanism 54 from its unlocked position to its locked position and vice versa.

The lock system 30 also comprises an actuating handle 60 for actuating the three-point mechanism 54, allowing the three-point mechanism 54 to be reversibly moved between the locked position (FIG. 3) and the unlocked position (FIG. 4) by tilting the axis C2 to one side or the other of the line X. This handle is more clearly visible in FIGS. 3 and 4, which show a cross-sectional view of the three-point lock 51 in a transverse plane (in the directions V and T shown in the figures), arranged in the middle of the side walls of the three-point lock support, respectively the locked and unlocked positions of the three-point mechanism 54.

The actuating handle 60 is movable between two positions: a first position corresponding to the locked position of the three-point mechanism 54 (FIG. 3) and a second position corresponding to the unlocked position of the three-point mechanism 54 (FIG. 4). Hereafter, the first position of the handle will also be referred to as the locked position and the second position of the handle as the unlocked position.

The actuating handle 60 is movable in rotation about the axis C3 at a first end 60A. In other words, the actuating handle 60 may be manipulated to tilt reversibly between the locked and unlocked positions.

In addition, the axis C2 of the three-point mechanism 54 is secured to the actuating handle 60. To this end, the actuating handle comprises an orifice through which the central axis C2 of the three-point mechanism 54 passes.

As a result, the first end 60A is secured to and connected to the second connecting rod 56 of the three-point mechanism 54.

Alternatively, the second connecting rod 56 and the actuating handle 60 are formed in one-part, i.e. they are continuous.

Thus, tilting the actuating handle 60 from the locked position (FIG. 3) to the unlocked position (FIG. 4) allows the three-point mechanism 54 to be operated by driving the axis C2 of the three-point mechanism 54 from a position wherein it is above/on one side of the force alignment line X to a position wherein it is below/on the other side of the force alignment line X.

The actuating handle 60 comprises a locking bush 70 secured to a second end 60B opposite the first end 60A.

Figure 5:
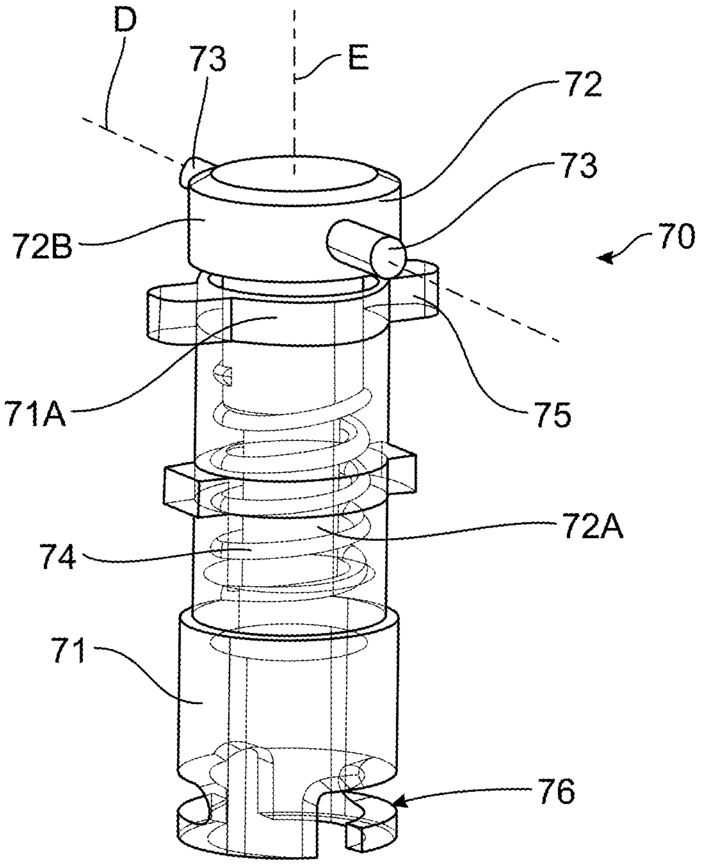
FIG. 5 is a partial schematic view of a locking bush equipped to the three-point lock of FIGS. 3 and 4.
Figure 6:
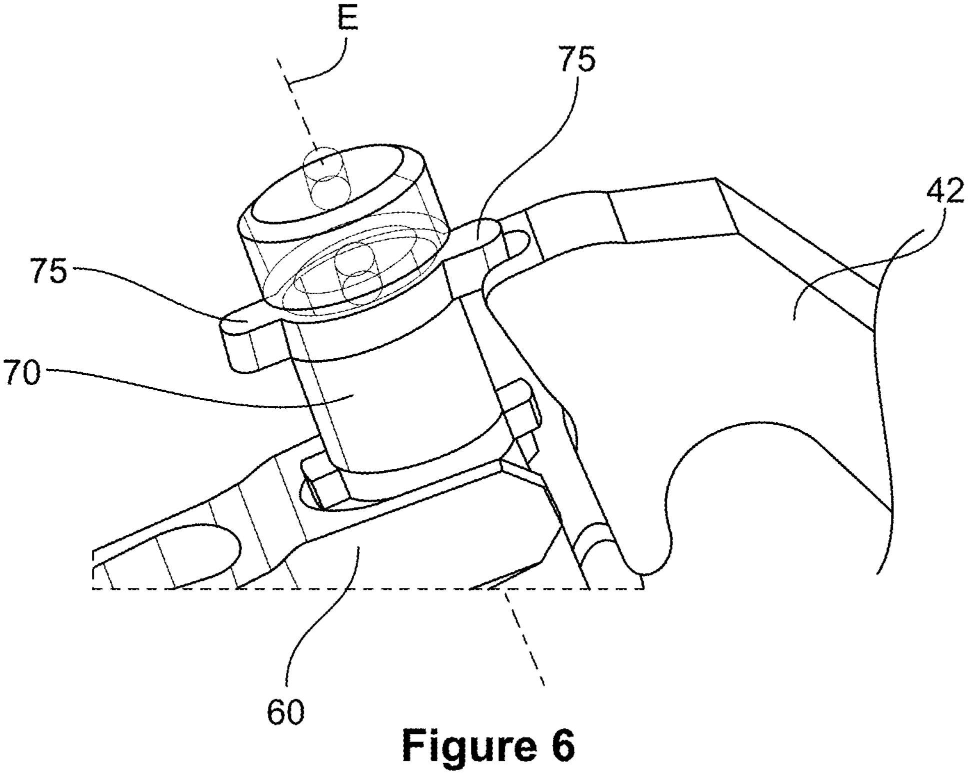
FIG. 6 is an enlarged schematic view of a hook of the lock system of FIG. 2 in the locked and blocked position.

FIG. 5 shows a partial view of the locking bush 70.

The locking bush 70 is mounted so as to pivot about an axis D relative to the support 52 of the three-point lock 50 between a first end position when the three-point mechanism 54 is in the locked position (FIG. 3) and a second end position when the three-point mechanism is in the unlocked position (FIG. 4).

The axis D for pivoting the locking bush is parallel to the axes C1, C2, C3 and C.

The two end positions of the locking bush 70 are angularly spaced by an angle which depends on the length of the connecting rods 55, 56 of the three-point mechanism 54. The greater the length of the connecting rods, the smaller the pivoting angle, e.g. approximately 5°. Similarly, the shorter the length of the connecting rods, the greater the pivoting angle, for example approximately 45°. Preferably, the tilt angle is approximately 20°.

The bush 70 comprises a substantially cylindrical body 71 extending along a longitudinal axis E and a locking guide 72 arranged at a first end 71A of the body 71 of the bush.

The body 71 of the bush has a generally hollow tubular shape.

The locking guide 72 comprises a first cylindrical portion 72A housed in a cavity formed in the hollow tubular shape of the body of the bush and a second cylindrical portion 72B. The second cylindrical portion 72B has larger external dimensions than the first cylindrical portion 72A so that only the first cylindrical portion 72A of the locking guide 72 is inserted into the body 71 of the bush, the second cylindrical portion 72B coming into abutment against the first end 71A.

The locking guide 72 comprises two cylindrical pins 73 extending radially in opposite directions from the second cylindrical portion 72B so as to form the pivot axis D of the bush 70.

The support 52 of the three-point lock 51, in particular each side wall, comprises a cavity for receiving the bush 70, this cavity being formed in each side wall of the support, for example by machining. The side walls of the lock support 52 also comprise orifices arranged opposite each other to receive the pins 73 of the lock guide.

A helical spring 74 is arranged in the bush 70 between the body 71 of the bush and the first cylindrical portion 72A of the locking guide 71.

Advantageously, the locking bush comprises at least one locking nipple 75 extending radially from the cylindrical body 71 of the bush 70. The locking nipples 75 are shaped to secure the hook by holding it in the loop, thus forming a lock referred to as secondary lock. More specifically, when the locking bush 70 is in the blocked position, the or one of the locking nipples 75 is in contact with the hook 42 to keep the hook engaged in the loop. The hook 42 may also comprise an open cavity to receive the locking nipple 75 of the bush 70.

In addition, the lock system 30 comprises a blocking tool 80 adapted to cooperate with the locking bush 70. The blocking tool 80 is configured to maneuver the locking bush 70 between a blocked position (FIG. 15) and an unblocked position (FIG. 14) when the locking bush 70 is in its first end position (FIG. 3). The blocking tool 80 is also configured to prevent the actuating handle 60 from being operated as long as the locking bush 70 is in its blocked position.

The blocking tool 80 comprises a rod 83 with a first end 83A and an opposite second end 83B.

Advantageously, the blocking tool 80 comprises a coupling head 81 arranged at the end 83A of the rod 83. The coupling head 81 and the locking bush 70 are shaped so as to couple to each other as long as the locking bush 70 is not in its blocked position and to disengage from each other when the locking bush 70 is in its first end position (FIG. 3).

Preferably, the blocking tool 80 forms a male part of a bayonet coupling and the locking bush 70 forms a female part of the bayonet coupling. For example, the locking bush 70 has a bayonet guide 76, while the coupling head 81 of the blocking tool 80 has a bayonet insert 84 shaped to cooperate with the bayonet guide 76.

Advantageously, the blocking tool 80 may comprise a locking indicator 85 arranged at the second end 83B of the rod 83 visible outside the nacelle as long as the coupling head 81 and the locking bush 70 are coupled together. For example, the locking indicator 85 is a flag or ribbon that is easily visible from outside the nacelle when the lock system 30 is unlocked or locked but not blocked, in other words when the locking bush 70 is in its unlocked position. The indicator may only be removed when the lock system 30 is locked and blocked, in other words when the locking bush 70 is in its blocked position.

To this end, the support 41 of the hook 42 advantageously comprises a plate 86 shaped to extend in a plane transverse to the hook 42. The plate 86 is secured to the support 41 and comprises a through orifice 87 shaped to receive the blocking tool 80. The through orifice 86 is shaped to allow the removal of the blocking tool only when the locking bush 70 is in its blocked position.

Figure 10:
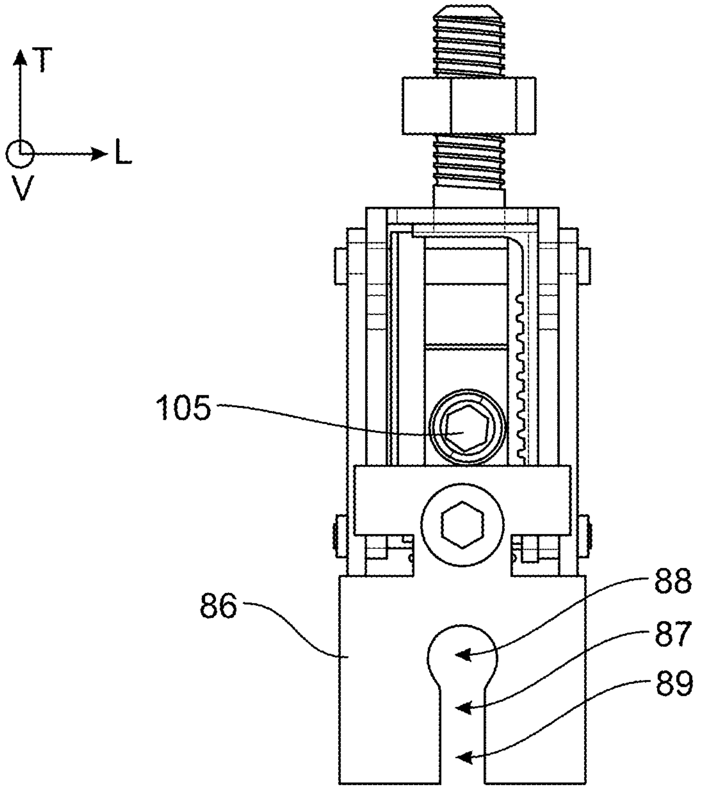
FIG. 10 is a bottom view of the part of a lock system shown in FIGS. 8 and 9.
Figure 16:
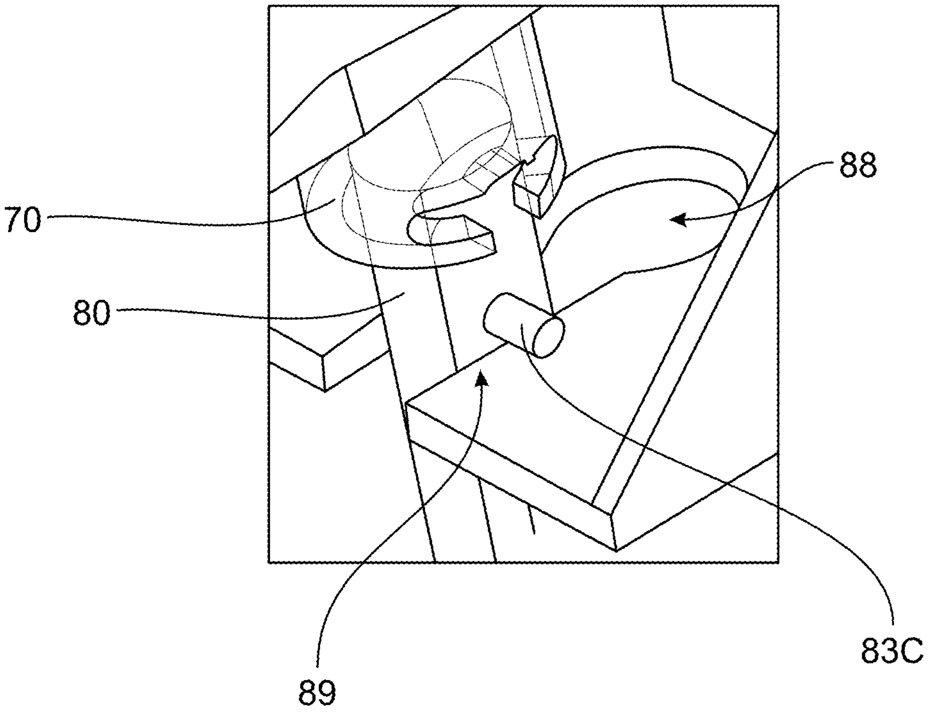
FIG. 16 shows an enlarged view of the blocking tool being locked.
Figure 17:
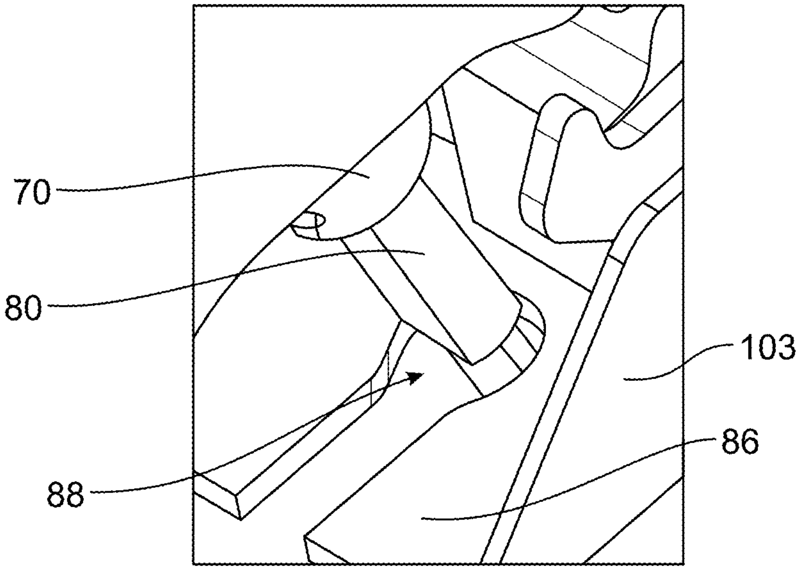
FIG. 17 shows an enlarged view of the blocking tool being blocked.

In the example shown and in particular in FIGS. 10, 16 and 17, the through orifice 87 comprises a circular part 88 whose dimensions allow the blocking tool 80 and in particular its coupling head 81 to pass through (FIG. 17) and a substantially rectangular part 89 whose dimensions are smaller than those of the circular part 88 so as to prevent the blocking tool 80 from being removed (FIG. 16).

To this end, the rod 83 of the blocking tool has at least one flat, i.e. it has a non-circular cross-section in order to prevent the rotation of the blocking tool when it is in the substantially rectangular part 89 of the through orifice 87. Preferably, the section of the rod 83 has two opposite flat sides connected together by two rounded portions, as shown in FIG. 17.

In addition, the rod 83 of the blocking tool may advantageously comprise pins 83C extending perpendicularly from the rod and in particular from the flat sides of the rod and shaped to prevent the blocking tool 80 from being removed by the substantially rectangular part 89 and to allow the blocking tool 80 to be removed by the circular part 88 (FIG. 10).

In the example shown, the through orifice 87 is open at the end of the plate 86. Alternatively, the through orifice may be closed. In this case, the length of the rectangular part 89 of the through orifice 87 is shaped to allow the angular movement of the tooling.

Advantageously, the lock system may also comprise a take-up system configured to take the second cowl up to the first cowl to close the cowls.

In the example shown in the figures, the lock system 30 does indeed comprise such a take-up system 90.

The take-up system 90 as illustrated comprises a rack slide 91 that may be moved in translation relative to the support of the hook 42 in the direction of the second cowl 28. The slide 91 may be moved in translation in the transverse direction T.

Figure 7:
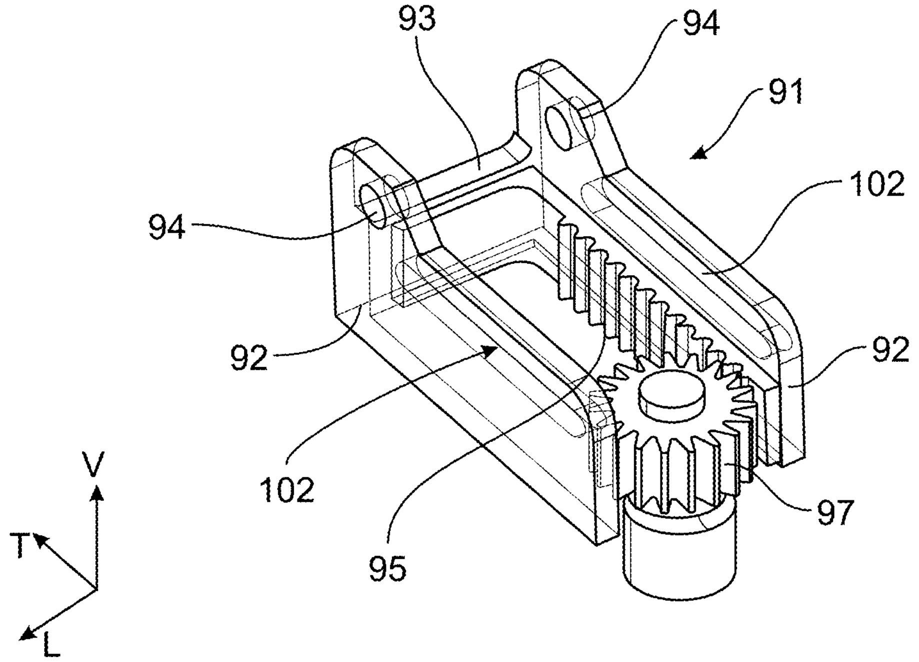
FIG. 7 shows a schematic perspective view of a rack slide equipped to the lock system shown in FIG. 2.
Figure 8:
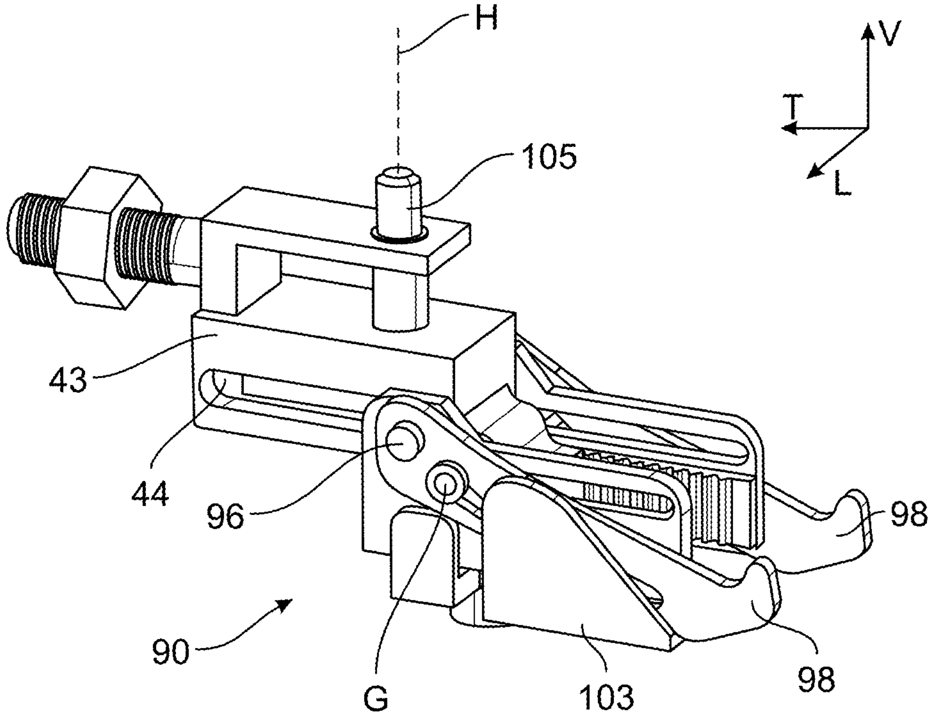
FIG. 8 is a schematic view of another part of the lock system of FIG. 2 relating to the hook when the slide of FIG. 7 is in the advanced position.

Referring to FIG. 7, the slide 91 comprises two parallel side walls 92 connected by a central wall 93. The side walls 92 of the slide extend in transverse planes. The central wall 93 is perpendicular to the side walls 92.

The side walls 92 comprise circular through orifices 94 arranged opposite each other and configured to house an axis F for guiding the slide and the racks 95 arranged opposite each other.

The support 41 of the hook 42 also comprises two parallel side walls 43 which also extend in transverse planes. The side walls 43 of the support 41 each have an opening 44 for guiding the slide 91.

A pin 96 forming the guide axis of the slide passes successively through the circular orifice 94 of one side wall 92 of the slide, the guide opening 44 of one side wall 43 of the hook support 41, the guide opening 44 of the other side wall 43 of the hook support 41 and the circular orifice 94 of the other side wall 92 of the slide 91.

Figure 9:
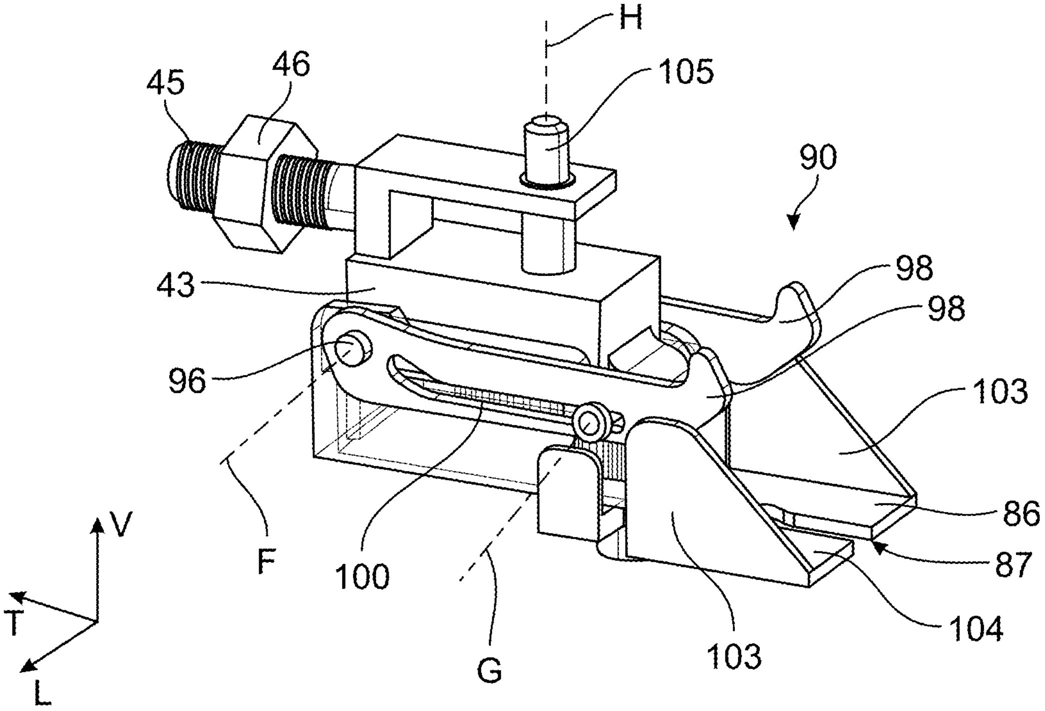
FIG. 9 is a schematic view of the part of a lock system shown in FIG. 8 when the slide is in the retracted position.

The take-up system 90 also comprises a control pinion 97 shaped and configured to mesh with the racks 95 of the slide 91 causing the latter to move in translation between an advanced position wherein the cowls 26, 28 are moved away from each other (FIG. 8) and a retracted position wherein the cowls 26, 28 are taken-up towards each other allowing the cowls to be in closed position (FIG. 9).

The control pinion 97 may be operated manually or by an electric motor.

In addition, the take-up system 90 comprises at least one auxiliary hook 98 arranged on the rack slide 91. Preferably, and as illustrated in the figures, the take-up system 90 comprises two auxiliary hooks 98 arranged on either side of the main hook 42.

The or each auxiliary hook 98 is configured to cooperate in a retaining manner with the loop 53 as the cowls 26, 28 are taken-up.

Each auxiliary hook 98 is movable in rotation about the axis F for guiding the slide and therefore has a hole through which the pin 96 may pass.

In addition, each auxiliary hook 98 has a slot 100 passing through it to guide the movement of the auxiliary hook receiving an axis G for tilting the secondary hook.

Each side wall 92 of the slide 91 comprises an opening 102 for guiding the auxiliary hooks 98.

This tilting axis G may be formed by another pin 101 passing through the guide slots 100 in the auxiliary hooks 98 and the guide openings 102 in the side walls 92 of the slide 91.

Advantageously, the plate 86 of the support 41 comprises two walls 103 extending perpendicularly to a central portion 104 wherein the through orifice 87 for the passage of the blocking tool 80 is formed. Each wall 103 of the plate 86 extends in a transverse plane, i.e. parallel to the auxiliary hooks 98, the side walls 92 of the slide and the side walls 43 of the hook support 41. The take-up system 90 is shaped so that each auxiliary hook 98 is arranged between a side wall 92 of the slide and a wall 103 of the plate 86, the wall 103 of the plate 86 thus forming a guide for the auxiliary hook 98.

Such a take-up system 90 using a control pinion actuating a rack means that it may be operated more easily by electrical means, for example, than the current systems.

This type of take-up system allows an increase of the take-up capacities compared with the current solution. This take-up capacity is defined by the travel of the rack and the length of the auxiliary hooks.

In the example shown in the figures, the lock system also comprises a safety screw 105 with a substantially vertical longitudinal axis H, configured to secure the main hook 42 to its support 41 so that it may be easily removed in the event of seizing up of the lock or a malfunction/damage preventing the lock from being operated.

Figure 11:
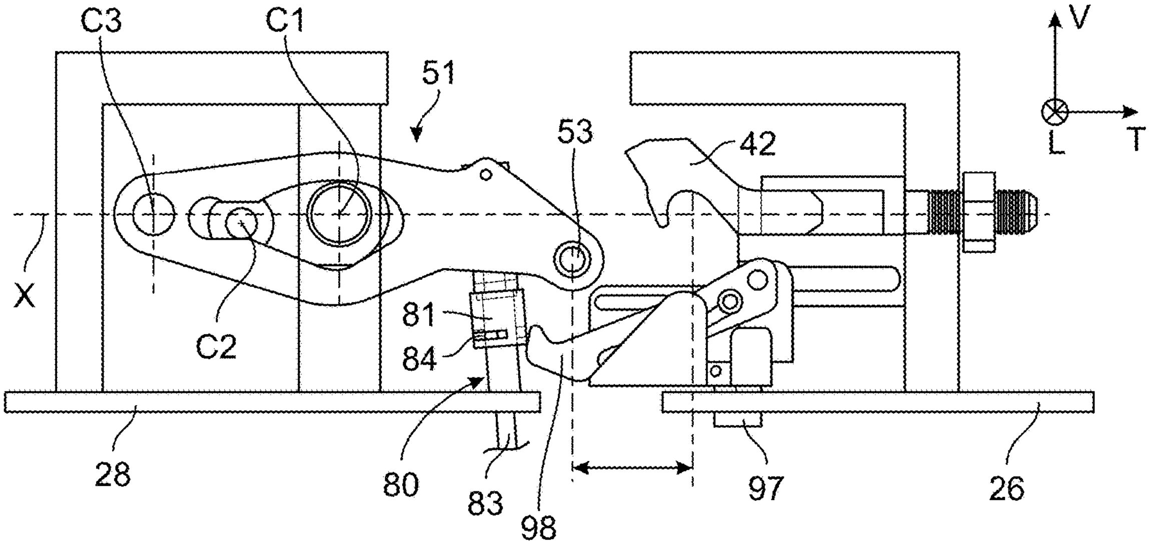
FIG. 11 shows the lock system in the unlocked position with the cowls open and the slide in FIG. 7 in the advanced position.
Figure 12:
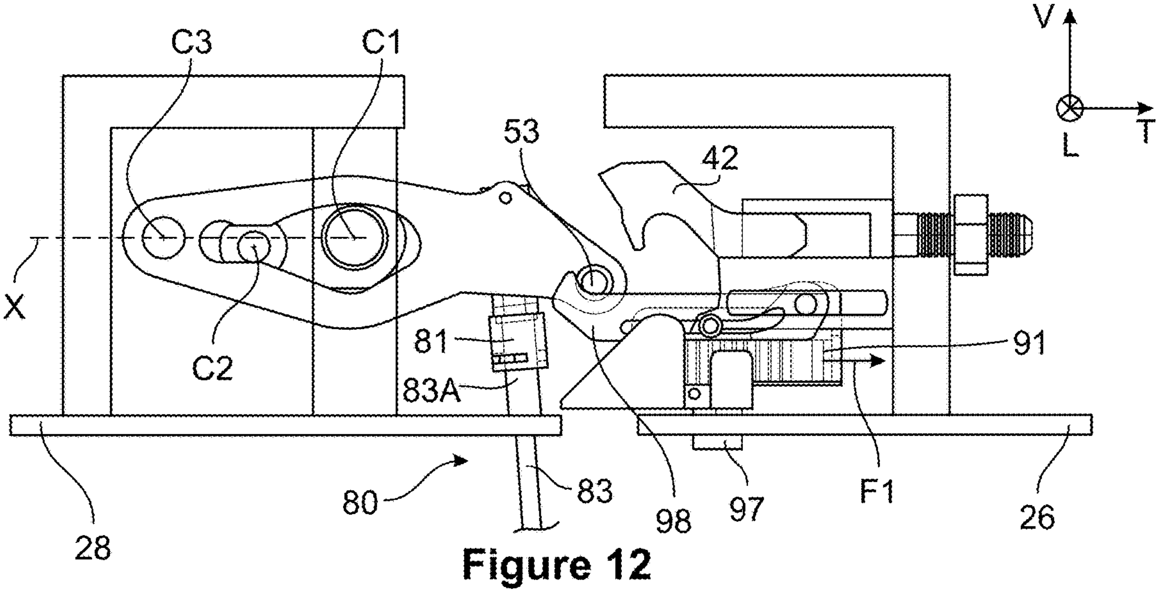
FIG. 12 shows how the cowls are taken-up together to close and lock the lock system.
Figure 13:
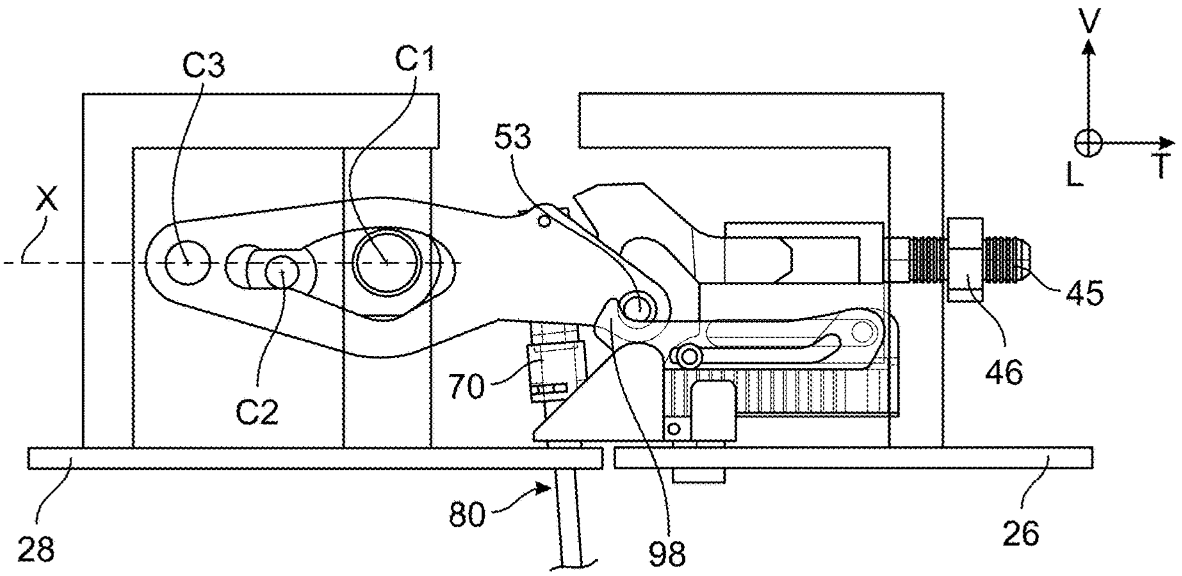
FIG. 13 shows the lock system at the end of the take-up phase, the lock system being ready to be locked, with the slide in FIG. 7 in the retracted position.

The operation of the lock will now be described in detail with reference to FIGS. 11 to 15. FIGS. 11 to 13 illustrate successive phases in the process of taking-up the first and second cowls 26, 28 closer together, using the take-up system 90.

The lock system 30 is unlocked and the cowls are opened.

In the first approach phase illustrated in FIG. 11, the take-up system 90 is in a configuration wherein the rack slide 91 is in its advanced position and the auxiliary hooks 98 are therefore inclined downwards.

The rotation of the control pinion 97 (FIG. 12) in one direction causes its teeth to mesh with the racks 95 of the rack slide 91, causing the rack slide 91 to move from an advanced position (FIG. 11) towards a retracted position (FIG. 13).

The meshing of the control pinion 97 with the racks 95 of the rack slide 91 causes the slide 91 and the auxiliary hooks 98 to move in translation in the transverse direction in the direction of the arrow F1. The axis F for guiding the slide 91 supporting the secondary hooks 98 slides in the guide openings 44 of the support 41 of the main hook 42. The translation of the auxiliary hooks 98 in the direction of the arrow F1 causes them to tilt upwards about their pivot axis F, thereby taking them up to the loop 53 until they engage the loop 53 in a retaining manner.

By moving in translation the slide 91 in the direction of the arrow F1, the second cowl 28 may be taken up to the first cowl 26 to close the cowls.

In the end retracted position shown in FIG. 13, the cowls are in the closed position, allowing the lock to be locked, since the auxiliary hooks 98, still engaged with the loop, have taken the loop 53 up as close as possible to the main hook 42, allowing the lock to be locked.

In this configuration, the blocking tool 80 is engaged in the locking bush 70 and is inserted into the substantially rectangular part 89 of the orifice 87 formed in the plate 86 of the support of the hook 42 by taking-up the two cowls.

In addition, the three-point lock is in its unlocked position, so the axis C2 of the three-point mechanism 54 is in a position wherein it is below the line X aligning the forces.

To lock the lock system, the blocking tool 80 is moved along the axis of the locking bush 70 towards the locking guide (arrow F2) so that the axis C2 of the three-point mechanism 54 passes above the line X aligning the forces. The three-point mechanism 54 is in its locked position.

This movement allows the hook 42 to cooperate with the loop 53.

This movement of the blocking tool 80 simultaneously causes the locking bush to pivot about the axis D from its second end position (FIG. 4) towards its first end position (FIGS. 3 and 14) and consequently causes the blocking tool 80, still coupled with the locking bush 70, to move into the substantially circular part 88 of the orifice 87 formed in the plate 86 of the support of the hook 42.

Figure 14:
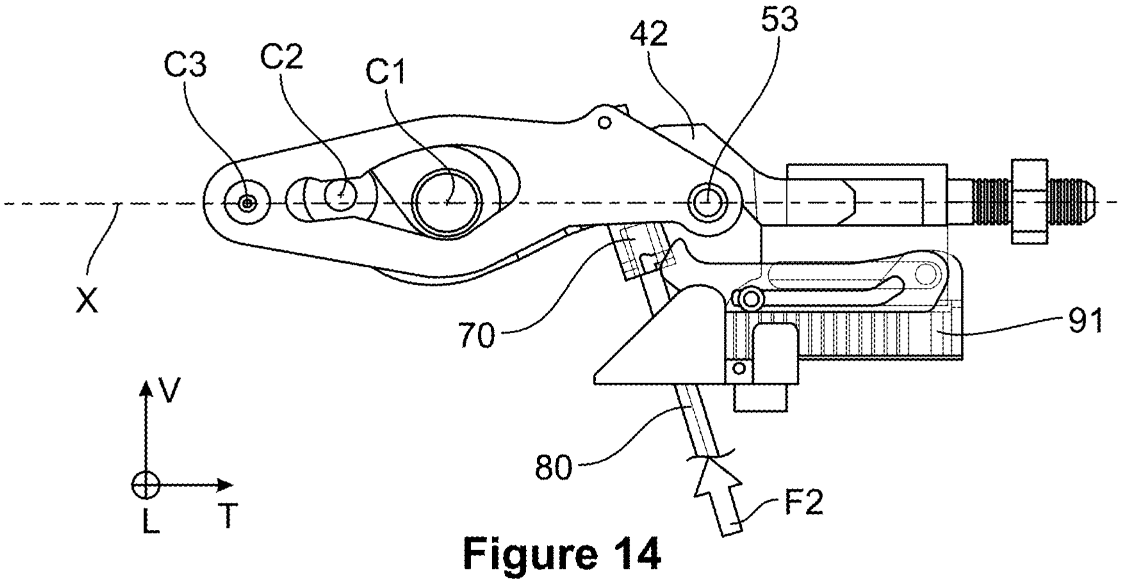
FIG. 14 shows the lock system after it has been locked and before the tooling is removed.
Figure 15:
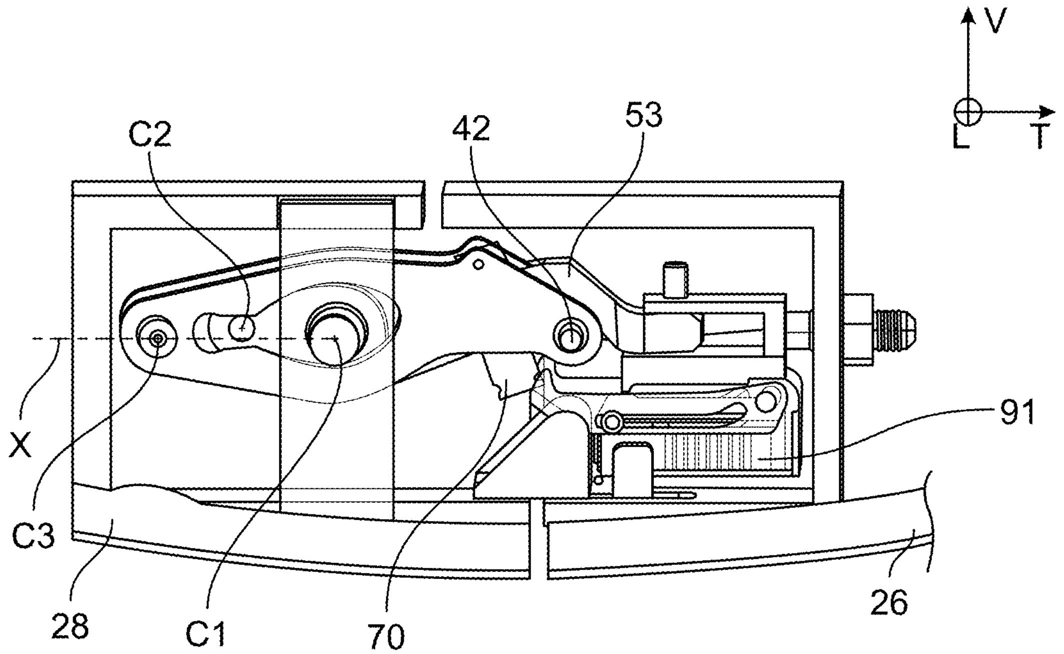
FIG. 15 shows the lock system after the locking bush has been locked and the blocking tool removed.

In this first end position of the locking bush 70 illustrated in FIG. 14, a rotation of the blocking tool 80 about its longitudinal axis is permitted and causes the locking bush 70 to move from its unblocked position to its unblocked position illustrated in FIG. 15, wherein the blocking tool 80 has been detached from the locking bush 70 and removed through the substantially circular part 88 of the orifice 87 formed in the plate 86 of the support of the hook 42.

As a result, the indicator hooked to the blocking tool 80 no longer protrudes from the cowls of the nacelle, ensuring that the cowls are closed and the lock locked and secured.

The invention claimed is:

1. A lock system for a turbine engine nacelle having a first cowl and a second cowl, the lock system comprising:
- a support configured to be attached to the first cowl and supporting a hook referred to as the main hook;
- a three-point lock configured to be attached to the second cowl, comprising a support, a yoke secured to the support, and a three-point mechanism hingedly connected at a point of the support, the three-point mechanism being movable between a locked position, wherein the hook cooperates in a retaining manner with the yoke in a closed position of the first and second cowls, and an unlocked position, wherein the hook is disengaged from the yoke and permits opening of the first and second cowls; and
- an actuating handle for actuating the three-point mechanism between the locked and unlocked positions, the actuating handle having a first end connected to the three-point mechanism,
- wherein the actuating handle comprises a locking bush secured to a second end opposite the first end, the bush being mounted so as to pivot relative to the support of the three-point lock between a first end position when the three-point mechanism is in the locked position and a second end position when the three-point mechanism is in the unlocked position, and
- wherein the lock system comprises a blocking tool adapted to cooperate with the locking bush and configured to:
  - maneuver the locking bush between a blocked position and an unblocked position when the locking bush is in its first end position; and
  - prevent a maneuver of the actuating handle as long as the locking bush is in its blocked position.

2. The lock system of claim 1, wherein the blocking tool comprises a coupling head arranged at one end of a rod, the coupling head and the locking bush being shaped to couple to each other as long as the locking bush is not in its blocked position and to disengage from each other when the locking bush is in its first end position.

3. The lock system of claim 2, wherein the blocking tool forms a male part of a bayonet coupling and the locking bush forms a female part of the bayonet coupling.

4. The lock system of claim 2, wherein the blocking tool comprises a locking indicator visible outside the nacelle as long as the coupling head and the locking bush are coupled together.

5. The lock system of claim 1, wherein the locking bush comprises a cylindrical body and a locking nipple extending radially from the cylindrical body, and wherein the locking nipple is configured to hold the hook in engagement with the yoke when the locking bush is in the blocked position.

6. The lock system of claim 1, further comprising a take-up system configured to take the second cowl up to the first cowl to close the cowls.

7. The lock system of claim 6, wherein the take-up system comprises:
- a rack slide which may be moved in translation relative to the support of the hook in the direction of the second cowl;
- at least one auxiliary hook arranged on the rack slide and configured to cooperate in a retaining manner with the yoke when the cowls are taken-up; and
- a control pinion configured to mesh with the rack of the rack slide, causing the latter to move in translation between an advanced position wherein the cowls are moved away from each other and a retracted position wherein the cowls are taken-up towards each other, permitting the cowls to be closed.

8. The lock system of claim 7, wherein the take-up system comprises two auxiliary hooks arranged on either side of the main hook.

9. The lock system of claim 1, wherein the support of the hook comprises a plate shaped to extend in a plane transverse to the hook, the plate comprising a through orifice shaped to receive the blocking tool, the through orifice being shaped to allow the removal of the blocking tool only when the locking bush is in its blocked position.

10. A turbine engine nacelle comprising a first cowl, a second cowl, and a lock system according to claim 1, the support supporting the hook being attached to the first cowl and the three-point lock being attached to the second cowl, the lock system being shaped to lock the cowls in the closed position when it occupies a locking configuration and to allow the cowls to be opened when it occupies an unlocking configuration.

* * * * *